UNITED STATES PATENT OFFICE.

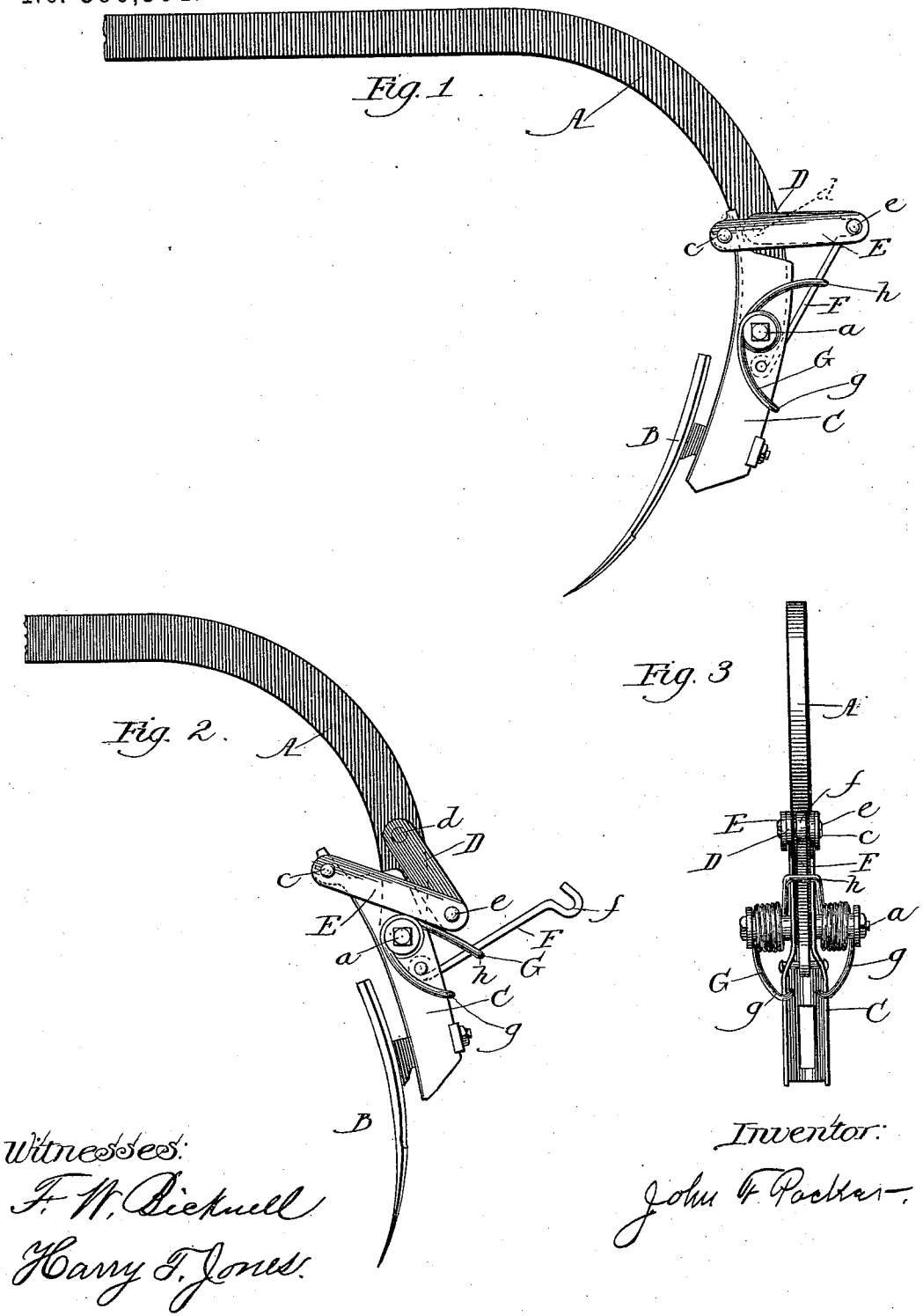

JOHN F. PACKER, OF CHICAGO, ILLINOIS, ASSIGNOR TO THE DAVID BRADLEY MANUFACTURING COMPANY, OF SAME PLACE.

CULTIVATOR.

SPECIFICATION forming part of Letters Patent No. 396,364, dated January 15, 1889.

Application filed October 27, 1888. Serial No. 289,320. (No model.)

*To all whom it may concern:*

Be it known that I, JOHN F. PACKER, residing at Chicago, in the county of Cook and State of Illinois, and a citizen of the United States, have invented a new and useful Improvement in Cultivators, of which the following is a specification, reference being had to the accompanying drawings, in which—

Figure 1 is a side elevation showing the cultivator-shovel in working position. Fig. 2 is a similar view showing the shovel tilted back. Fig. 3 is a rear elevation, the parts being in the position shown at Fig. 1.

This invention relates to cultivators, and especially to devices for permitting the cultivator-shovel to release itself from stones, roots, or other obstacles in cases where the cultivator would be injured or broken by the increased draft of the team if the shovel were not released from the obstacle.

The object of this invention is to provide a device for supporting the shovel of the cultivator from the beam or standard, so that the shovel can be tilted backward when it strikes a stone, root, or other obstacle, and will be automatically returned to its normal position when the obstacle is passed, which I accomplish as illustrated in the drawings, and hereinafter described. That which I claim as new will be pointed out in the claims.

In the drawings, A represents a cultivator beam or standard.

B is a shovel.

C is a shovel-support, preferably made of channel-iron. This shovel-support C is pivoted a little above its center by a bolt, $a$, to the beam or standard A, and to its lower end is bolted the shovel B.

D D are two links, one at each side of the standard or beam A. Pivoted at their front ends is a standard or beam, A, by a single pivot, $d$.

E E are small links, one on each side of the standard or beam A, pivoted at their rear ends by a pin or pivot, $e$, to the rear ends of the links D and at their front ends by a pivot, $c$, to the shovel-support C.

F is a locking bar or rod, which is pivoted at one end in the shovel-support C below the bolt $a$, and at its other end is provided with a hook, $f$, adapted to hook over the pin or pivot $e$ when the parts are in their normal position, as shown in Figs. 1 and 3.

G is a spring, preferably made in the form shown, which has its lower end or ends, $g$, in engagement with the rear edges of the shovel-support C, at its middle is coiled around the bolt $a$, as shown in Fig. 2, and has a loop or upper portion, $h$, which engages with the rear edge of a rod, F, in the position shown in Figs. 1 and 3.

In use the parts are normal in the position shown in Figs. 1 and 3, in which the pivot $d$ is a little above a line through the pivots $c$ and $e$, as shown in Fig. 1, and the hook $f$ is in engagement with the pin $e$, which holds the links D and E nearly parallel to each other and the shovel-support and the shovel in working position. When the shovel B strikes or catches against a stone, root, or other obstacle, the increased draft of the team will jerk the shovel with sufficient force to throw the pin E out of the hook $f$, which allows the shovel to tilt or tip back to nearly a vertical position, the links D and E assuming the position shown in Fig. 2. The bolt $a$ limits the movement of the link E. The tilting or tipping of the shovel B permits the standard or beam and the shovel to be raised by the force of the jerk, so as to pass over the obstacle. When the obstacle has been passed, the sides of the loop $h$ of the spring G will act against the lower edge of the link E, raising it toward its normal position and forcing the rod F against the pin $e$, which will act to further lift the links D and E and throw the pin $e$ into the hook $f$, which holds the links D and E in their normal position. It will thus be seen that with the ordinary draft the shovel and its support will be firmly held in their normal position, because the links D and E are held in a nearly parallel position by the hook on the rod F; but when the shovel strikes an obstacle the jerk or suddenly-increased force of the team will tilt or tip the shovel and allow it to pass the obstacle without injury to the cultivator, and that after passing the obstacle the shovel will be automatically returned to its normal position by the spring G and held there by the hook on the rod F.

When cultivating in hard soils, spring-sustained shovels are liable to tremble or be unsteady when the spring only is relied on to maintain the shovel in working position. By the application of the locking-bar or hooked rod F such trembling or unsteadiness as occurs when the machine is running near the limit of the tension of the spring is avoided.

The device above described is designed for use on a cultivator, but may be used on a seeder, grain-drill, or any similar machine.

What I claim as new, and desire to secure by Letters Patent, is as follows:

1. In a cultivator-beam, the combination, with a spring-sustained pivoted shovel-support, C, of the locking bar or rod F, whereby the spring-vibrations are prevented from being communicated to the shovel, substantially as described.

2. A standard or beam and a shovel and shovel-support pivoted to the beam, in combination with links D and E, hooked rod F, and spring G, constructed substantially in the form shown, substantially as and for the purpose specified.

JOHN F. PACKER.

Witnesses:
F. W. BICKNELL,
HARRY T. JONES.